United States Patent [19]
Zechmann et al.

[11] Patent Number: 6,009,984
[45] Date of Patent: Jan. 4, 2000

[54] METHOD AND APPARATUS FOR CONTROLLING THE BRAKE SYSTEM OF A VEHICLE

[75] Inventors: Juergen Zechmann, Heilbronn; Albrecht Irion, Stuttgart, both of Germany

[73] Assignee: Robert Bosch GmbH, Stuttgart, Germany

[21] Appl. No.: 08/852,994

[22] Filed: May 8, 1997

[30] Foreign Application Priority Data

May 30, 1996 [DE] Germany ............ 196 21 628

[51] Int. Cl.[7] .................................................. B60T 11/00
[52] U.S. Cl. ..................... 188/353; 303/89; 192/13 A
[58] Field of Search ............................ 188/353, 265; 303/89, 125; 192/13 A, 13 R

[56] References Cited

U.S. PATENT DOCUMENTS

| | | | |
|---|---|---|---|
| 4,131,325 | 12/1978 | Bayliss | 303/155 |
| 4,610,338 | 9/1986 | Kubota et al. | 192/13 A |
| 4,684,177 | 8/1987 | Ha | 303/89 |
| 4,708,406 | 11/1987 | Takagi et al. | 303/116.1 |
| 4,717,207 | 1/1988 | Kubota et al. | 188/353 X |
| 4,802,562 | 2/1989 | Kuroyanagi et al. | 303/15 X |
| 5,129,496 | 7/1992 | Sigl et al. | 192/0.049 |

*Primary Examiner*—Robert J. Oberleitner
*Assistant Examiner*—Pamela J. Lipka
*Attorney, Agent, or Firm*—Fulbright & Jaworski, LLP

[57] ABSTRACT

A hill-holder function is initiated when the brake pedal is actuated while the vehicle is in at least one operating state. The braking force is thus locked into at least one wheel brake independently of the extent to which the pedal is actuated. This braking force is decreased again when the brake pedal is released.

14 Claims, 3 Drawing Sheets

METHOD AND APPARATUS FOR CONTROLLING THE BRAKE SYSTEM OF A VEHICLE

BACKGROUND OF THE INVENTION

The invention pertains to a method and to an apparatus for controlling the brake system of a vehicle where, in at least one operating state in which the brake pedal is being actuated, the braking force is held in at least one wheel of the vehicle independently of the extent to which the pedal is actuated.

U.S. Pat. No. 5,129,496 describes the realization of an automatic parking brake by suitable control of the brake system. For this purpose, when the brake pedal is actuated and the velocity of the vehicle has fallen below a very small value, the brake pressure in the wheel brakes is locked in, that is, kept constant, by the switching of a valve, and possibly increased as well by the actuation of a pressure-generating means (a pump). The locked-in brake pressure is not released again until the driver starts the vehicle moving.

SUMMARY OF THE INVENTION

It is an object of the invention to create an automatic parking brake function (hill-holder function) in which the behavior of the vehicle is the same as that shown by a vehicle without an automatic parking brake function (hill-holder function).

This is achieved by decreasing the braking force in the wheel or wheels when the brake pedal is released.

By means of the invention, the vehicle behaves in the accustomed fashion even when a so-called hill-holder function is being used. It is especially advantageous that the brake pressure prescribed by the driver is locked into the brake system by means of appropriate valve control when the driver actuates the brake pedal and a corresponding request signal is present (from a driver-actuated button or from a stopped vehicle detector).

It is advantageous that, while the pressure is locked in, the driver is required to exert much less force on the pedal. When the brake pedal is released, the pressure is automatically decreased. It is thus ensured that the vehicle behaves in the accustomed manner. Because the vehicle is free to roll when the brake pedal is released, there is no longer any need for measures to detect whether the driver wants to move the vehicle.

In the situation where the clutch pedal is depressed before the brake is released, it also especially advantageous for the holding function to be taken over by the depressed clutch pedal until the vehicle starts moving again.

The same advantages are derived in conjunction with electric motor-driven brakes when, in the situation described, the applied braking moment or the generated braking force is kept constant or increased independently of the degree to which the pedal is actuated.

DESCRIPTION OF EXEMPLARY EMBODIMENTS

Figure 1:
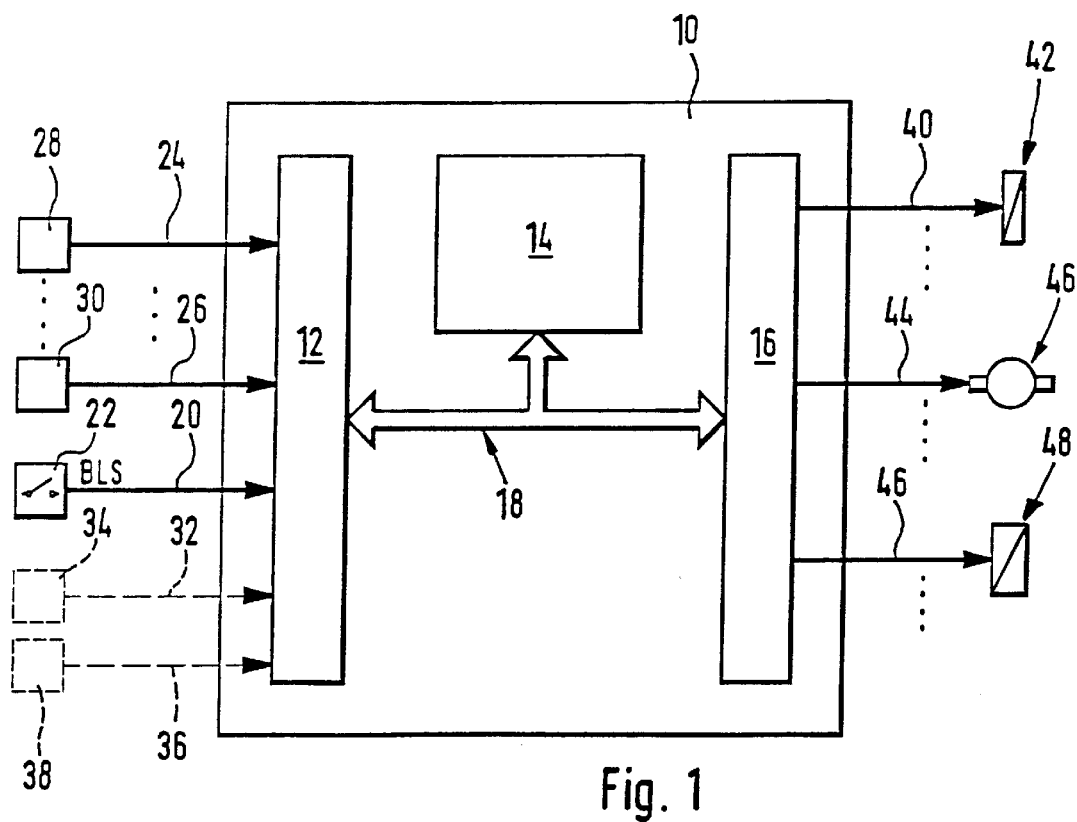
FIG. 1 shows a control unit for the brake system of a vehicle.

FIG. 1 shows a control unit 10 for controlling the brake system of a vehicle. This control unit 10 comprises an input circuit 12, at least one microcomputer 14, and an output circuit 16. The input circuit, the microcomputer, and the output circuit are connected to each other by a communications system 18 for the mutual exchange of information and data. Input lines from various measuring devices, which, in a preferred exemplary embodiment, are integrated into a bus system, e.g., a CAN, are connected to input circuit 12. A first input line 20 leads from a brake pedal switch 22 to control unit 10. This line carries a brake pedal switch signal BLS. Input lines 24–26 connect control unit 10 to wheel velocity sensors 28–30; these lines transmit signals pertaining to the velocities of the wheels of the vehicle. In a preferred exemplary embodiment, furthermore, an input line 32 is also provided, which transmits a signal from a clutch switch 34; this signal represents the actuation status of the clutch pedal of the vehicle. In an advantageous exemplary embodiment, yet another input line 36 is provided, which leads from a push-button switch 38, which can be actuated by the driver, to control unit 10; over this line, the driver can activate the hill-holder function according to the invention.

Output lines are attached to output circuit 16 of control unit 10; these lines drive actuating elements for controlling the vehicle's wheel brakes. In the preferred exemplary embodiment, the brake system is a hydraulic brake system, so that output lines 40 lead to valves 42 for controlling the brake pressure in the individual wheel brakes, whereas, if desired, pressure-generating means 46 (pumps) for the individual brake circuits are driven via output lines 44. In a preferred exemplary embodiment, at least one control valve 48 is driven over output line 46; this valve keeps the brake pressure constant in at least one wheel brake when the brake pedal is actuated and thus implements the hill-holder function described above. In the preferred exemplary embodiment, this control valve 48 is the switching valve which is provided to implement drive slip control by interrupting the connection between the master brake cylinder and the wheel brakes.

The solution according to the invention can also be applied with the same advantages to pneumatic brake systems and to electrically controlled brake systems. The braking force, applied by the actuation of the brake pedal under the driver's command and transmitted via conventional pressure lines or by electrical means, is kept at certain values or increased at individual wheel brakes when the hill-holder function is active by the switching of valves and possibly by the actuation of pumps and/or by the maintenance of constant drive signals or the adjustment of the drive signals to certain values.

In a preferred exemplary embodiment, control unit 10 with its microcomputer 14 implements at least one drive slip control and possibly in addition a driving dynamics control under actuation of the brake system of the vehicle. Controls of this general type are known from the prior art. In addition, as a supplemental function, a so-called "hill-holder" function is provided, which, in addition to a parking brake action, also has an action which helps vehicles with manual transmissions start moving on hills and helps prevent vehicles with automatic transmissions from creeping. In principle, when a hill-holder function such as this is present, the brake pressure specified by the driver is locked in by means of valve actuations (especially ASR switching valves) in the brake system in response to a signal and then released under certain conditions or at least when the driver wishes to drive on again. The request signal for the hill-holder function can be derived from, for example, a driver-actuated button or from an automatic stopped vehicle detector; an example of stopped vehicle detection is known from U.S. Pat. No.

5,129,496. During this period, the pressure in the wheel brake cylinders is locked in, so that the amount of force which must be exerted on the pedal is much smaller. The driver need only let his foot rest on the brake pedal. According to the invention, it is provided that the locked-in state of the brake pressure is released when the driver takes his foot off the brake pedal. The vehicle then behaves in the accustomed fashion and is free to roll.

There is no need for any additional safety precautions such as, for example, provisions for detecting whether the driver moves the vehicle while the hill-holder function is active.

In an advantageous elaboration of this solution, the hill-holder function is also used to improve the start-up process. For this purpose, when, in addition to the brake pedal, the clutch pedal is also depressed before the brake pedal is released, the pressure holding function is taken over by the status of the clutch pedal. The holding function is then maintained until the driver releases the brake and starts to drive on.

In the case of hydraulic and pneumatic brake systems, the locking-in of the brake pressure in the wheel brake cylinders is carried out by the switching of at least one control valve. In an exemplary embodiment, the brake pressure is locked into all the wheel brakes, in other exemplary embodiments only into selected wheel brakes.

Figure 2:
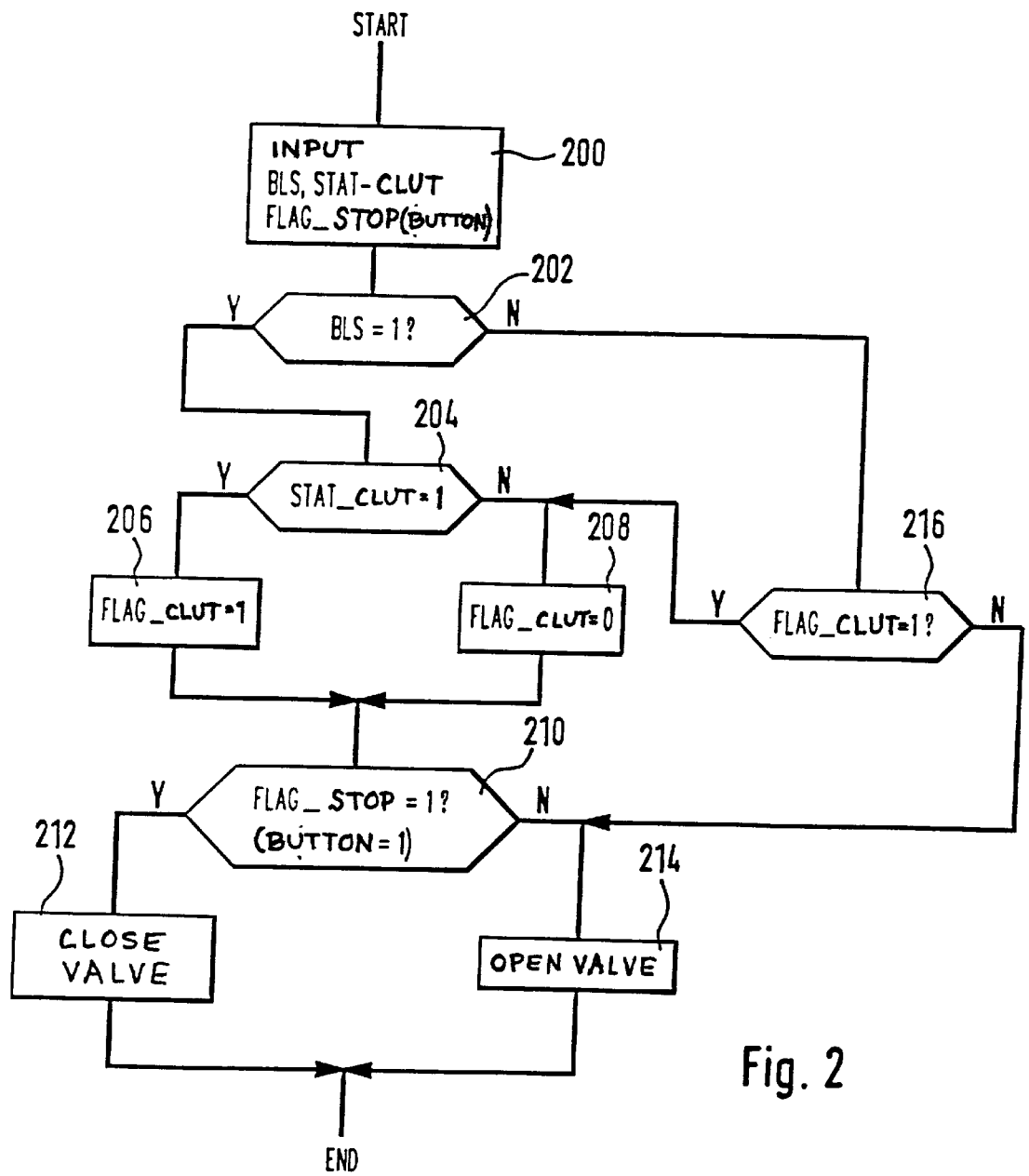
FIG. 2 is a flow diagram which represents a computer program running in a microcomputer of the control unit.
Figure 3A:
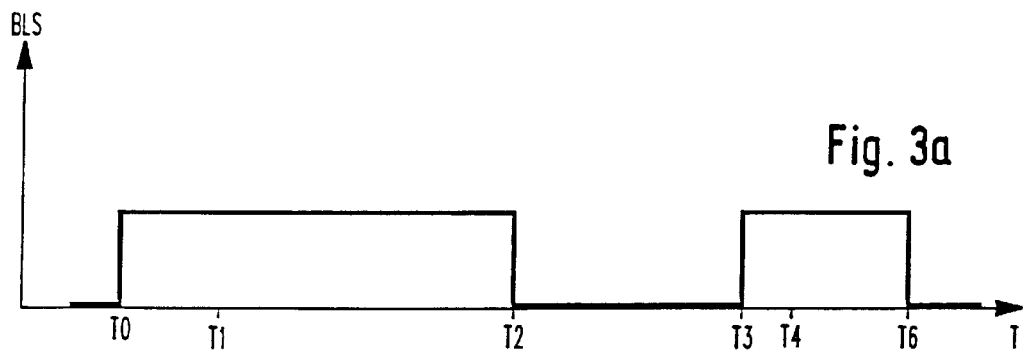
FIGS. 3a–3d show time diagrams for the brake light switch, clutch status, vehicle velocity, and valve status.
Figure 3B:
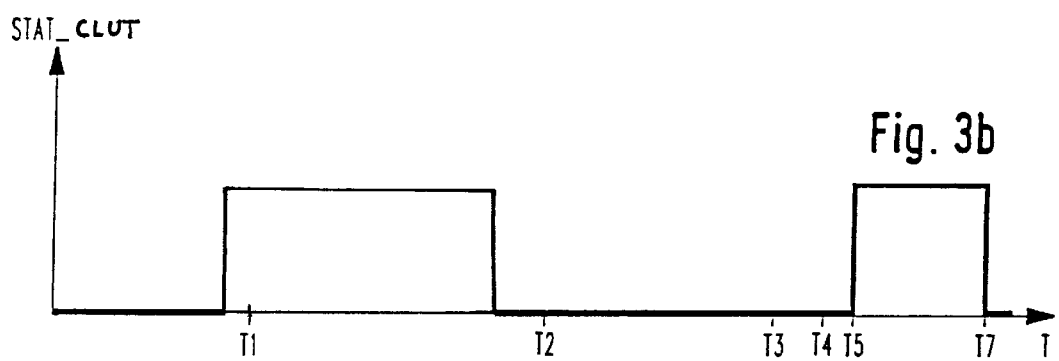
Figure 3C:
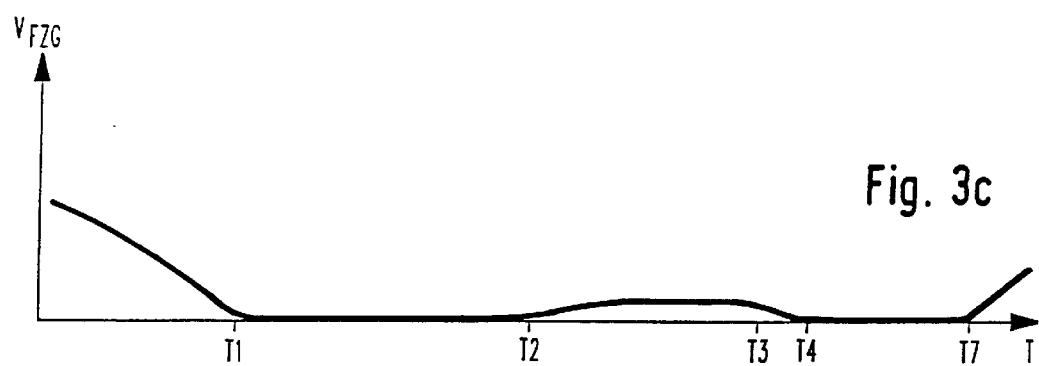
Figure 3D:
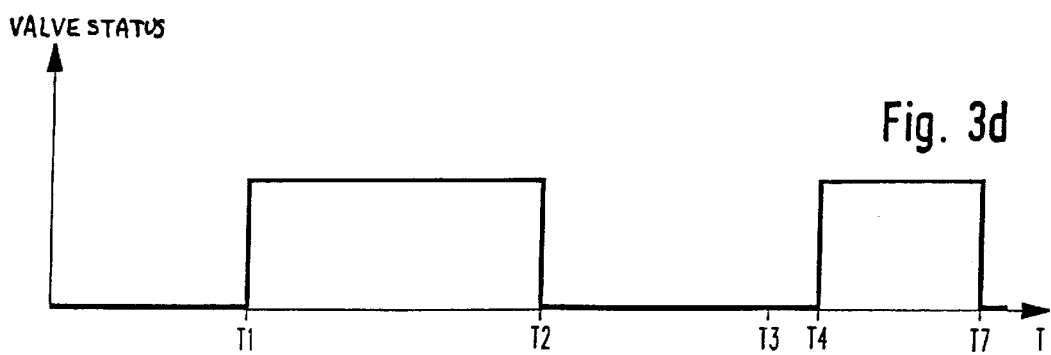

FIG. 2 illustrates the invention on the basis of an example in the form of a flow chart, which describes a program running on microcomputer 14.

The program shown in FIG. 2 is started at given intervals of, for example, every 10–100 milliseconds. In the first step 200, the status BLS of the brake light switch, possibly that of the clutch switch STAT_CLUT, a flag of the stopped vehicle detector FLAG_STOPPED, and/or the status of push-button (BUTTON) are read in as input. In the next step 202, the program checks to see whether or not brake pedal switch signal BLS has the value 1. If it does, it means that the brake pedal has been actuated. If the pedal has been actuated, the program checks in step 204 to see whether or not the clutch pedal has also been actuated (STAT_CLUT= 1) simultaneously with the actuation of the brake pedal. If the clutch pedal has been actuated, then in step 206 a corresponding flag FLAG_CLUT is set to the value 1; if the clutch pedal has not been actuated, the flag is set to 0 in step 208. If the vehicle is equipped with an automatic transmission instead of a manual transmission, steps 204–208 are omitted.

In question step 210, the program checks to see whether the request signal for initiating the hill-holder function is present. This signal originates either from a stopped vehicle detector, where preferably the flag characterizing a stopped vehicle is checked, and/or from a push-button, which can be actuated by the driver. If a request signal such as this is present, then in step 212 at least one valve is actuated to lock in the brake pressure; in the case that no request signal is present, the valve is driven in such a way in step 212 that the brake pressure in selected wheel brakes is not locked in. After steps 212 and 214, the subprogram ends and is repeated after the specified interval.

If the result of step 202 indicates that the brake pedal is no longer being actuated, then the program checks to see in step 216 whether or not the flag for the actuated clutch is present, that is, to see whether or not FLAG_CLUT has the value 1. If this is the case, the program continues with step 204; otherwise, it proceeds with step 214.

The exemplary embodiment described in conjunction with FIG. 2 is used in vehicles with manual transmissions. In the case of automatic transmissions, steps 204, 206, 208, and 216 are omitted. In this case, the hill-holder function is turned on by the actuation of the brake pedal and turned off by the release of the brake pedal independently of the status of the vehicle.

The exemplary embodiment of the hill-holder function illustrated in FIG. 2 is clarified in FIG. 3 on the basis of time diagrams. FIG. 3a shows the change over time in the brake pedal switch signal; FIG. 3b shows the change in clutch actuation; FIG. 3c shows the change in the velocity of the vehicle; and FIG. 3d shows the status of at least one valve, which has the effect of locking the brake pressure into the wheel brakes.

At time $t_0$, the driver actuates the brake pedal. The velocity of the vehicle is thus reduced to a value of 0 by time $t_1$. Because the vehicle is then at a standstill, a request signal for the hill-holder function is generated, which leads to the actuation of the valve at time $t_1$. At time $t_2$, the driver releases the brake, which leads to the opening of the valve at time $t_2$ by an appropriate form of actuation. Then the vehicle is free to roll. At time $t_3$, the driver actuates the brake pedal again. The vehicle then comes to a stop at time $t_4$, which again leads to the actuation of the valve. At time $t_4$, the driver depresses the clutch pedal to start moving again (see FIG. 3b). With the release of the brake pedal at time $t_6$, the holding function is then taken over by the clutch pedal actuation status. At time $t_7$, the vehicle starts moving again as the clutch is released. Therefore, at time $t_7$, at the end of the actuation of the clutch pedal, the valve is actuated in such a way as to decrease the brake pressure.

We claim:

1. Method for controlling the brake system of a vehicle, having a brake pedal depressed by a driver and brakes at each wheel, said method comprising:

detecting whether the brake pedal is being depressed;

detecting whether the vehicles stops;

outputting control signals to actuating elements for controlling a braking force at at least one wheel brake which maintains a braking force in said at least one wheel brake independently of the extent to which the brake pedal is depressed, detecting whether the brake pedal is released or not; and outputting control signals to said actuating elements which release said braking force at said at least one wheel brake when said brake pedal is released even when the driver does not start the vehicle moving.

2. Method as in claim 1 wherein said braking force is maintained only when an appropriate switching signal from the driver is present.

3. Method as in claim 1 wherein the braking force is increased in at least one wheel brake.

4. Method as in claim 1 wherein said brake system is a hydraulic brake system comprising means for implementing a drive slip control including a switching valve, which switching valve is closed when said braking force is maintained and opened when said braking force is decreased.

5. Method as in claim 1 wherein said braking force is maintained in all of said wheel brakes.

6. Method for controlling the brake system of a vehicle, having a brake pedal depressed by a driver and brakes at each wheel, said method comprising:

detecting whether at least one of the brake pedal and a clutch pedal are being depressed;

detecting whether the vehicle stops;

maintaining the braking force in at least one wheel brake independently of the extent to which a brake pedal is depressed;

maintaining said braking force while said clutch pedal is actuated, at least until said brake pedal is released when said clutch pedal and said brake pedal have been depressed simultaneously;

releasing said braking force in said at least one wheel brake when said brake pedal is released, even when the driver does not start the vehicle moving, when said clutch pedal and said brake pedal have not been actuated simultaneously.

7. Method as in claim 6 wherein said braking force is decreased only when said brake pedal and said clutch pedal have been released.

8. Apparatus for controlling a brake system of a vehicle, said apparatus comprising: a control unit for controlling the brake system, which, responsive to the actuation of the brake pedal and a determination that the vehicle has stopped, holds the braking force in at least one wheel brake independently to the extent to which the brake pedal is actuated, wherein the control unit releases the braking force again in said at least one wheel brake when said brake pedal is released, even if the driver does not want to move the vehicle.

9. Apparatus as in claim 8 wherein said braking force is maintained only when an appropriate switching signal from the driver is present.

10. Apparatus as in claim 8 wherein said vehicle is equipped with a clutch pedal, said apparatus further comprising means for detecting when said clutch pedal and said brake pedal are actuated simultaneously, said control unit maintaining said brake force while said clutch pedal is actuated, at least until said brake pedal is released.

11. Apparatus as in claim 10 wherein said braking force is decreased only when said brake pedal and said clutch pedal have been released.

12. Apparatus as in claim 8 wherein the braking force is increased in at least one wheel brake.

13. Apparatus as in claim 8 wherein said brake system is a hydraulic brake system comprising means for implementing a drive slip control including a switching valve, which switching valve is closed when said braking force is maintained and opened when said braking force is decreased.

14. Apparatus as in claim 8 wherein said braking force is maintained in all of said wheel brakes.

\* \* \* \* \*

UNITED STATES PATENT AND TRADEMARK OFFICE
CERTIFICATE OF CORRECTION

PATENT NO. : 6,009,984　　　　　　　　　　　　　　　　　　　　Page 1 of 1
DATED : January 4, 2000
INVENTOR(S) : Zechmann et al.

It is certified that error appears in the above-identified patent and that said Letters Patent is hereby corrected as shown below:

Column 4,
Line 23, change "$T_4$" to -- $T_5$ --.

Signed and Sealed this

Seventh Day of August, 2001

*Attest:*

NICHOLAS P. GODICI
*Attesting Officer*　　*Acting Director of the United States Patent and Trademark Office*